United States Patent
Landon

(10) Patent No.: US 8,537,540 B2
(45) Date of Patent: Sep. 17, 2013

(54) FIELD SERVICEABLE CPU MODULE

(75) Inventor: Trevor Landon, Vienna, VA (US)

(73) Assignee: Technology Advancement Group, Inc., Dulles, VA (US)

( * ) Notice: Subject to any disclaimer, the term of this patent is extended or adjusted under 35 U.S.C. 154(b) by 144 days.

(21) Appl. No.: 12/917,733

(22) Filed: Nov. 2, 2010

(65) Prior Publication Data

US 2012/0106070 A1    May 3, 2012

(51) Int. Cl.
*G06F 1/20* (2006.01)

(52) U.S. Cl.
USPC .............................. 361/679.54; 361/679.46

(58) Field of Classification Search
USPC ........................ 361/679.33–679.55
See application file for complete search history.

(56) References Cited

U.S. PATENT DOCUMENTS

| | | | |
|---|---|---|---|
| 4,111,328 A * | 9/1978 | Eggert et al. ................. | 220/4.01 |
| 4,557,225 A * | 12/1985 | Sagues et al. .............. | 123/41.31 |
| 4,558,395 A | 12/1985 | Yamada et al. | |
| 4,656,559 A * | 4/1987 | Fathi ............................ | 361/721 |
| 5,014,904 A | 5/1991 | Morton | |
| 5,381,314 A * | 1/1995 | Rudy et al. .................... | 361/712 |
| 5,455,739 A | 10/1995 | Barden | |
| 5,528,474 A | 6/1996 | Roney et al. | |
| 5,548,481 A * | 8/1996 | Salisbury et al. ............ | 361/709 |
| 5,590,026 A | 12/1996 | Warren et al. | |
| 5,673,029 A * | 9/1997 | Behl et al. ..................... | 340/635 |
| 5,742,478 A * | 4/1998 | Wu ............................. | 361/704 |
| 5,825,621 A * | 10/1998 | Giannatto et al. ............ | 361/701 |
| 5,864,365 A * | 1/1999 | Sramek et al. ................ | 348/373 |
| 5,870,286 A * | 2/1999 | Butterbaugh et al. ........ | 361/704 |
| 5,927,386 A * | 7/1999 | Lin .............................. | 165/80.3 |
| 5,930,113 A * | 7/1999 | McCann ....................... | 361/704 |
| 5,946,193 A | 8/1999 | Hendrix et al. | |
| 6,028,769 A * | 2/2000 | Zurek .......................... | 361/704 |
| 6,038,129 A * | 3/2000 | Falaki et al. .................. | 361/699 |
| 6,046,908 A * | 4/2000 | Feng ............................ | 361/707 |
| 6,065,530 A * | 5/2000 | Austin et al. ................. | 165/80.3 |
| 6,069,792 A * | 5/2000 | Nelik ........................ | 361/679.47 |
| 6,104,611 A * | 8/2000 | Glover et al. ................. | 361/700 |
| 6,373,696 B1 * | 4/2002 | Bolognia et al. ......... | 361/679.47 |
| 6,411,514 B1 * | 6/2002 | Hussaini ....................... | 361/704 |
| 6,587,339 B1 * | 7/2003 | Daniels et al. ............... | 361/690 |
| 6,680,849 B2 * | 1/2004 | Atkinson et al. ............. | 361/719 |
| 6,867,963 B2 * | 3/2005 | Staiano .................... | 361/679.34 |
| 7,040,383 B2 * | 5/2006 | Oyamada ................. | 165/104.33 |
| 7,095,611 B2 | 8/2006 | Kunz | |

(Continued)

FOREIGN PATENT DOCUMENTS

| CN | 201274630 | 7/2009 |
|---|---|---|
| DE | 203 15 034 U1 | 1/2004 |

(Continued)

*Primary Examiner* — Adrian S Wilson
(74) *Attorney, Agent, or Firm* — Nixon Peabody LLP

(57) ABSTRACT

A computer apparatus comprising a computer chassis, a baseboard component disposed within the computer chassis and a computer module electronically coupled to the baseboard component is disclosed. A heat sink assembly is attached to the computer module to form a computer module heat sink assembly, wherein the heat sink assembly forms part of an integral exterior structure of the computer chassis. The chassis may comprise a compartment disposed through an exterior surface of the chassis for receiving the computer module heat sink assembly in mated fashion. The computer module heat sink assembly forms a water and air tight seal with the internal compartment of the chassis in mated fashion.

17 Claims, 4 Drawing Sheets

(56) References Cited

U.S. PATENT DOCUMENTS

| | | | |
|---|---|---|---|
| 7,133,284 B2* | 11/2006 | Lee | 361/697 |
| 7,136,286 B2* | 11/2006 | Chuang | 361/703 |
| 7,161,804 B2* | 1/2007 | Oyamada | 361/703 |
| 7,254,034 B2* | 8/2007 | Bolle et al. | 361/719 |
| 7,272,001 B2* | 9/2007 | Cheng | 361/679.48 |
| 7,355,857 B2* | 4/2008 | Pirillis et al. | 361/715 |
| 7,468,555 B2 | 12/2008 | Chen | |
| 7,622,802 B2 | 11/2009 | Paulus et al. | |
| 7,633,757 B2* | 12/2009 | Gustine et al. | 361/714 |
| 7,703,291 B2* | 4/2010 | Bushnik et al. | 62/3.2 |
| 7,817,412 B2* | 10/2010 | Sullivan | 361/679.33 |
| D627,316 S * | 11/2010 | Theisen et al. | D13/182 |
| 7,826,212 B2* | 11/2010 | Shogan et al. | 361/679.46 |
| 8,009,431 B2* | 8/2011 | Sun et al. | 361/727 |
| 8,238,102 B2* | 8/2012 | Wei et al. | 361/704 |
| 2002/0043608 A1* | 4/2002 | Nakata et al. | 248/560 |
| 2004/0070926 A1* | 4/2004 | Boykin et al. | 361/683 |
| 2005/0030719 A1* | 2/2005 | Lin et al. | 361/719 |
| 2006/0023416 A1* | 2/2006 | Chen | 361/685 |
| 2007/0058336 A1* | 3/2007 | Cheng | 361/687 |
| 2008/0054449 A1 | 3/2008 | Hirler et al. | |
| 2008/0158808 A1* | 7/2008 | Camarena et al. | 361/685 |
| 2008/0258277 A1 | 10/2008 | Hosseini et al. | |
| 2009/0009959 A1* | 1/2009 | Cheng | 361/687 |
| 2009/0009965 A1* | 1/2009 | Cheng | 361/695 |
| 2009/0093137 A1 | 4/2009 | Badehi et al. | |
| 2009/0229258 A1 | 9/2009 | Zapf et al. | |
| 2009/0267465 A1* | 10/2009 | Cheng | 312/223.2 |
| 2009/0268394 A1* | 10/2009 | Cheng | 361/679.54 |
| 2009/0271551 A1* | 10/2009 | Cheng | 710/301 |
| 2009/0273892 A1* | 11/2009 | Cheng | 361/679.6 |
| 2009/0309467 A1* | 12/2009 | Nelson et al. | 312/223.1 |

FOREIGN PATENT DOCUMENTS

| | | |
|---|---|---|
| EP | 1 947 921 A1 | 7/2008 |
| JP | 2007-097296 | 4/2007 |
| WO | WO 2009/138247 A2 | 11/2009 |

* cited by examiner

FIELD SERVICEABLE CPU MODULE

BACKGROUND OF THE INVENTION

1. Field of the Invention

The present invention relates generally to computer systems. More specifically, it relates to improvements in computer architecture by improving serviceability and upgradability of computer systems.

2. Description of Related Art

A computer-on-module (COM) is a type of single-board computer (SBC), a subtype of an embedded computer system. It is also called System on Module (SOM) as an extension of the concept of System on Chip (SoC) and lying between a full-up computer and a microcontroller in nature.

Today's COM/SOM modules are complete computers which may be built on a single circuit board. The design is centered on a single microprocessor with RAM, input/output controllers and all other features needed to be a functional computer on the one board. However, unlike a single-board computer, the COM module will usually lack the standard connectors for any input/output peripherals to be attached directly to the board. Instead, the wiring for these peripherals may be bussed out to connectors on the board.

The module may usually need to be mounted on a carrier board (or "baseboard") which breaks the bus out to standard peripheral connectors. Some COMs also include peripheral connectors and/or can be used without a carrier.

A COM/SOM solution offers a dense package computer system for use in small or specialized applications requiring low power consumption or small physical size as is needed in embedded systems. Some devices may also incorporate Field Programmable Gate Arrays.

The terms, "Computer-on-Module" and "COM," have become more notable upon industry standardization of the COMExpress format. COMExpress, a computer-on-module (COM) form factor, is a highly integrated and compact PC that can be used in a design application much like an integrated circuit component. Each COMExpress Module COM integrates core CPU and memory functionality, the common I/O of a PC/AT, USB, audio, graphics, and Ethernet. In some embodiments, all I/O signals may be mapped to high density, low profile connectors attached to the module.

COMExpress is a PCI Industrial Computer Manufacturers Group (PICMG) standard that defines a Computer-On-Module, or COM, packaged as a super component. The defined interfaces provide a smooth transition path from legacy parallel interfaces to LVDS (Low Voltage Differential Signaling) interfaces. This includes the PCI bus, parallel ATA, PCI Express and Serial ATA. COM Express defines five different pinout types in order to be scalable for future applications.

Thus, COMExpress is an open standard technology offering more compact and powerful computing solutions than, for example, blade-based computer systems. However, in some typical systems which incorporate COMExpress technology, substantial disassembly is required in order to change the COMExpress module. In some cases, it may be necessary to disassemble the entire system in order to service the COMExpress module. This can significantly increase labor and service/repair costs when servicing the COMExpress module.

In addition, further difficulties have occurred in addressing cooling requirements of conventional COMExpress systems. As computing power density increases, so does the heat that must be forced from the inside of the system to the environment external to the system. In convention systems, the placement of internal components including the COMExpress module and supporting components may actually hinder airflow and/or dissipation of heat. Thus, the ability of the system to create airflow sufficient to cool components, such as the COMExpress module, becomes encumbered by the blocking effect of the surrounding components. Therefore, a need exists for properly drawing and dissipating heat from the computer system and away from the COMExpress module.

SUMMARY OF THE INVENTION

The present invention provides a COMExpress computer module as field serviceable element within a computer system. This greatly reduces the service time required for a computer system using this technology when upgrades or replacements are required for the COMExpress module. Other embodiments provide cooling solutions integrated into the design of the computer system.

In accordance with one disclosed exemplary embodiment, an apparatus is provided having a computer chassis, a computer module disposed within the computer chassis, and a heat sink assembly attached to said computer module to form a computer module heat sink assembly, wherein the heat sink assembly forms part of an integral exterior structure of the computer chassis.

In accordance with another disclosed embodiment, an apparatus is provided having a computer chassis, a baseboard component disposed within the computer chassis and a computer module electronically coupled to the baseboard component. A heat sink assembly is attached to the computer module to form a computer module heat sink assembly, wherein the heat sink assembly forms part of an integral exterior structure of the computer chassis.

In accordance with yet another disclosed exemplary embodiment, a heat dissipation apparatus for an electronic device is provided having a computer module and a heat sink assembly attached to the computer module to form a computer module heat sink assembly. The heat sink assembly is formed and configured to integrate into an exterior structure of the electronic device.

In accordance with still another disclosed exemplary embodiment, a cooling module for an electronic device is provided having a computer module and a heat sink assembly having a plurality of fins attached to a surface thereto. The module may further include the heat sink assembly being attached to the computer module to form a computer module heat sink assembly. The heat sink assembly is formed and configured to integrate into the exterior of the electronic device as an integral structure.

Still other aspects, features and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

An improved computer system having a field serviceable COMExpress computer module is described. Embodiments of the present invention allow an intact computer system to be serviced or upgraded without disassembling the entire system. Depending on the environment in which the system is installed, upgrades are possible while still installed in the end application, with all interconnections attached. Other embodiments provide cooling solutions integrated into the design of the computer system. In the following description, for purposes of explanation, numerous specific details are set forth in order to provide a thorough understanding of the exemplary embodiments. It is apparent to one skilled in the art, however, that the present invention can be practiced without these specific details or with an equivalent arrangement.

Figure 1:
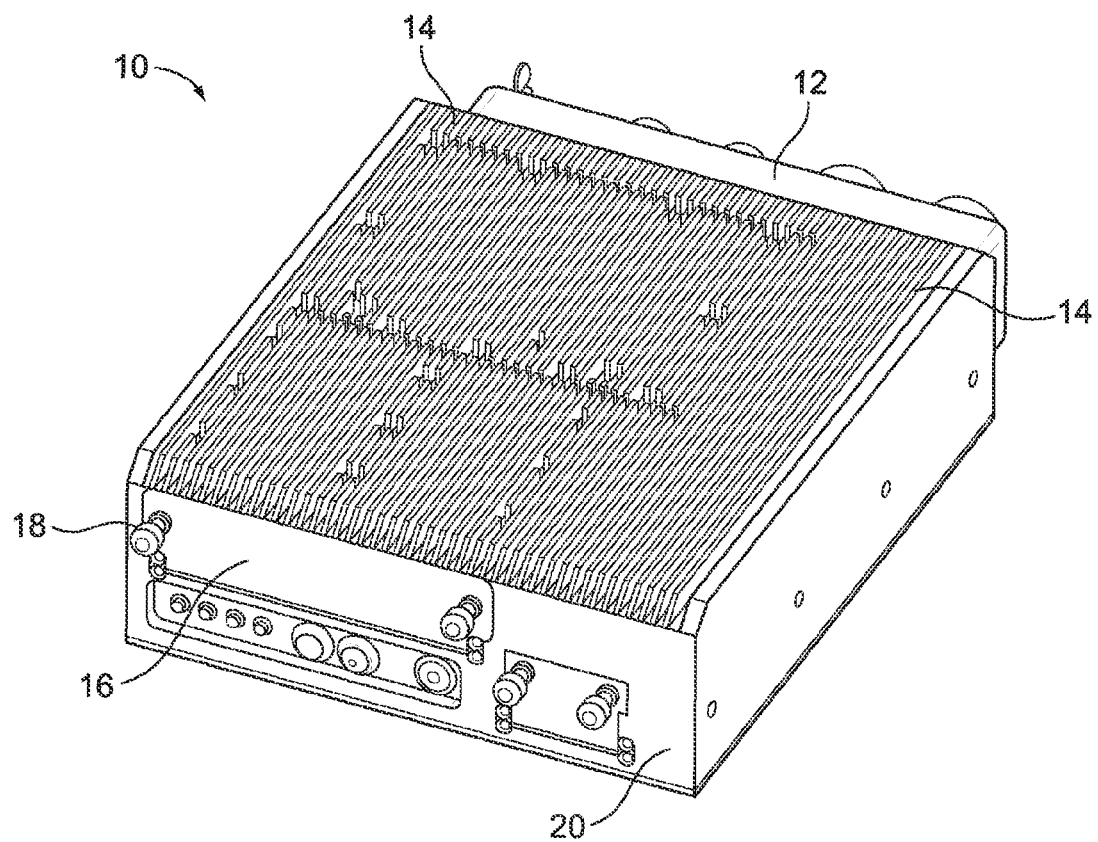
FIG. 1 provides a perspective view of a server according to an exemplary disclosed embodiment.

Referring now to the drawings, wherein like reference numerals designate identical or corresponding parts throughout the several views, FIG. 1 illustrates a server 10 internally arranged to receive electrical components enabling a dense architecture. Server 10 comprises an exterior case or chassis 12 for lodging and protecting internal components. The chassis 12 may be configured to support mounting capabilities as needed. A plurality of fins 14 are integrally configured into the body of the chassis 12. In other arrangements, fins 14 may be removable attached. Suitable materials including, aluminum, for example, may be utilized for forming the fins 14 and the exterior body of chassis 12 to dissipate heat from within the internal cavity of the chassis 12 to the exterior. Dissipated heat may include heat produced from components internal to chassis 12. The plurality of fins 14 facilitates formation of a heatsink assembly of the external chassis 12 system in order to cool components of server 10. Thus, the disclosed design facilitates efforts to provide a dense capacity of electronic elements with the prescribed area of chassis 12 without the need and/or added expense of providing additional or separate dedicated cooling system(s).

The front 20 of chassis 12 may include a cover plate 16 for accessing internal components of the server. The cover plate 16 may be secured to the chassis 12 by any appropriate securing means sufficient for securing the cover plate 16 in tight fit relation to the chassis 12 framing and sealed arrangement. In one embodiment, threaded fasteners 18 are provided to secure the cover plate 16 to chassis 12.

In the present embodiment, the chassis 12 of server 10 may house and support at least a heatsink/mass storage device retention assembly and a corresponding number of one or more mass storage devices. While one or more known computer bus interface designs may be supported by the present system, server 10 is preferably configured to support the Serial ATA (SATA)(Serial Advanced Technology Attachment) computer bus interface for connecting host bus adapters to mass storage devices such as hard disk drives and optical drives.

Figure 2:
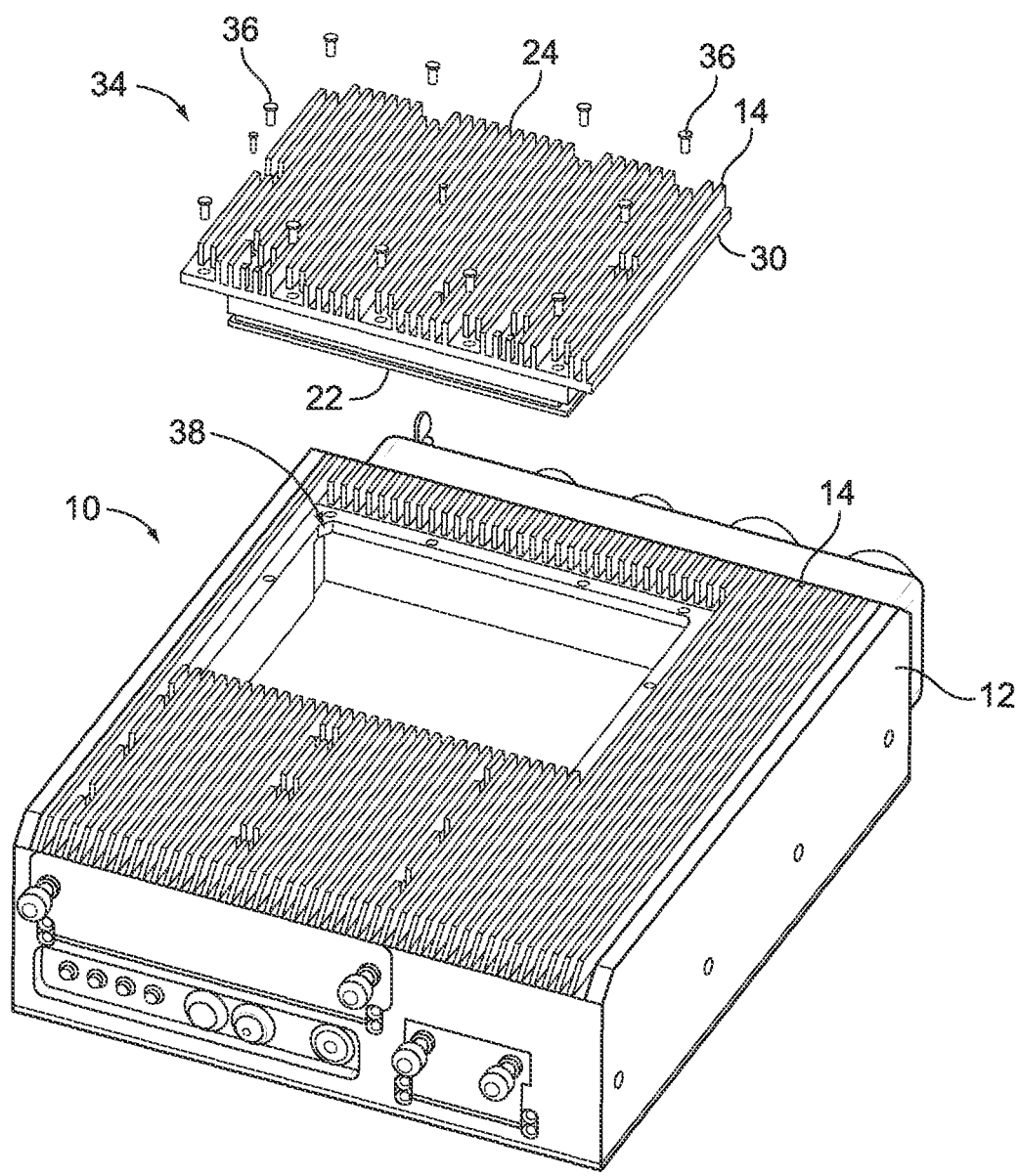
FIG. 2 illustrates a COMExpress computer module heatsink removed and held relative to the chassis of the server of FIG. 1.

The heatsink assembly of the external chassis 12 system may include a removable component of chassis 12 that allows access to internal components of the server 10. Turning to FIG. 2, a COMExpress module 22 is shown removed from the chassis 12 of server 10. A core element of the disclosed embodiment includes designing part of the external chassis 12 system to include a removable heatsink assembly portion 24 that is attached to the COMExpress module 22—the result, of which, is the formation of a COMExpress computer module heatsink assembly 34. In a preferred embodiment, the removable heatsink assembly portion 24 is attached to the COMExpress module 22. Any suitable attachment means may be employed for retaining the COMExpress module 22 to the heatsink assembly portion 24. This may include, for example, direct and indirect attachment of the COMExpress module 22 to the heatsink assembly portion 24 and/or any additional attachment elements such as mounts, adhesives, or fasteners, by way of example.

The removable heatsink assembly portion 24 of the COMExpress computer module heatsink assembly 34 may also become an integral part of the external chassis 12 system when it is attached to the chassis 12 as described below. In addition, removable heatsink assembly portion 24 provides structural support to the chassis 12 when mounted thereon.

In one embodiment, securing the COMExpress computer module heatsink assembly 34 with the chassis 12 comprises mating an attachment surface 30 of the removable heatsink assembly portion 24 with a fitted surface area 32 of the chassis 12. Thus, the fitted surface area 32 may be sufficiently configured to accommodate and receive the attachment surface 30 of the removable heatsink assembly portion 24 such the profile of the fins 14 of the removable heatsink assembly portion 24 and the chassis 12 are flush in a final assembly.

The COMExpress computer module heatsink assembly 34 is preferably removably retained to the fitted surface area 32 of chassis 12. By way of example, a plurality of threaded fasteners 36 may be inserted through the attachment surface 30 into mated insertion holes 38 of the fitted surface area 32 of chassis 12. Other suitable and appropriate means may be employed for retaining the COMExpress computer module heatsink assembly 34 to the chassis 12 so long as the resulting design accommodates reliable insertion and extraction of the COMExpress computer module heatsink assembly from the finished chassis 12 system. In addition, when mated, the fitted surface area 32 and the attachment surface 30 are preferably designed to form a water and air tight seal. The aforementioned sealing facilitates protection of internal components of server 10 such as those found in rugged environments and elements (e.g., sand, water, snow, extreme temperatures, etc.) The chassis 12 may also be capable of being deployed and supporting electronics in ruggedized conditions such as those found in military and aerospace computing applications. Accordingly, the chassis 12 is preferably configured to handle the requirements for dealing harsh environments including, for examples, shock, vibration, humidity and ambient temperature extremes.

A featured design of the disclosed chassis 12 compensates for a sealed system having relatively little or no airflow. The present system relies upon conduction to dissipate heat from electrical components disposed within the chassis 12 to outside of the system. For example, during operation, hot electrical components mounted to baseboard 46 are configured to transfer heat via attachment to COMExpress module 22 and to removable heatsink assembly portion 24 of the COMExpress computer module heatsink assembly 34. Heat is thereby dissipated from the server 10 via fins 14 of the heatsink assembly of the external chassis 12 system. The elimination of heat provides a cooling effect for the internal components of the chassis 12 system.

Figure 3:
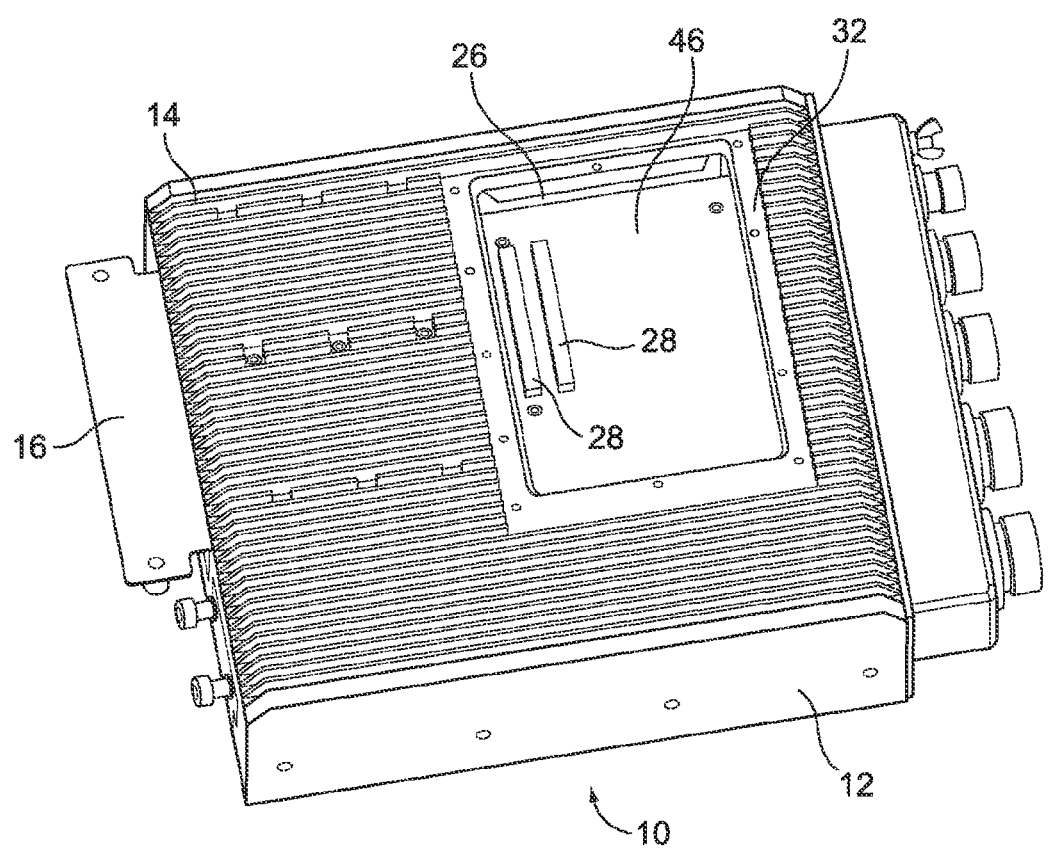
FIG. 3 illustrates a top perspective view of the server of FIG. 1 with the COMExpress computer module heatsink removed.

Turning to FIG. 3, an internal compartment 26 is designed and provided within an interior of the chassis 12 to accommodate the COMExpress module 22 of the COMExpress computer module heatsink assembly 34. The COMExpress module 22 is preferably configured to attach to the server 10 system via one or more baseboard connectors 28 disposed within the internal compartment 26 and electrically coupled to baseboard 46. This configuration establishes that the COMExpress module 22 is maintained generally parallel to the attached baseboard 46 unlike blade-based systems. Hence, in a final assembly, the chassis 12 of server 10 is preferably configured to accommodate the COMExpress computer module heatsink assembly 34 such that the heatsink and board assembly of the COMExpress computer module heatsink assembly 34 form a side wall in the chassis 12 system, and the board to board interconnect between the COMExpress module 22 and the baseboard 46 is maintained. The disclosed embodiment, therefore, facilitates heat dissipation from within chassis 12 to the plurality of fins 14 of the heatsink assembly and the fins 14 of the COMExpress computer module heatsink assembly 34. This may also include any heat dissipated from the COMExpress module 22 directly to the removable heatsink assembly portion 24 of the COMExpress computer module heatsink assembly 34.

Figure 4:
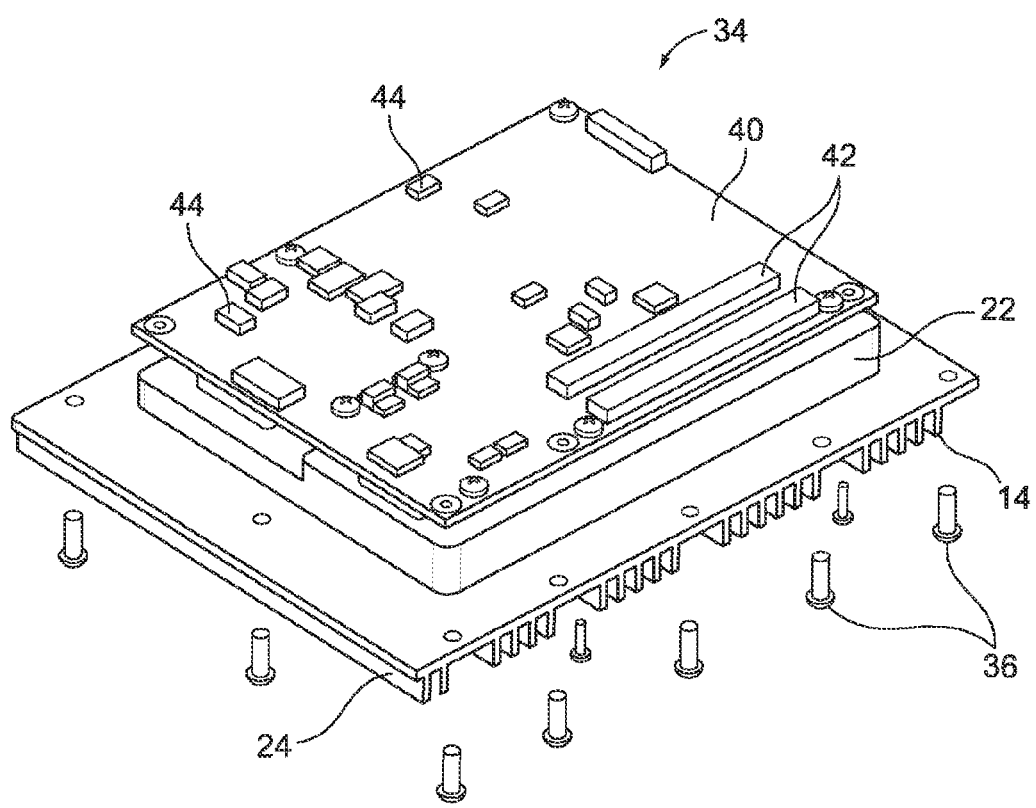
FIG. 4 illustrates a COMExpress computer module heatsink of the server of FIG. 1.

Turing to FIG. 4 a circuit board 40 of the COMExpress computer module heatsink assembly 34 is shown having hi-density connectors 42. The hi-density connectors 42 are preferably sized and designed to mate with the baseboard connectors 28 disposed within internal compartment 26. A plurality of other electronic components 44 may be assembled on circuit board 40. Once the COMExpress computer module heatsink assembly 34 is removed from chassis 12, the electrical components 44 may be easily and fully serviced (e.g., repaired, inspected, upgraded, etc.) as needed without impeding the operation or disassembling of other electrical components of the server 10 system. This feature may allow decreased service/down time of the COMExpress module 22, since its accessibility is enhanced by the easy of insertion and removal provided by the disclosed design. Accordingly, additional savings may be realized, since the disclosed design allows servicing from within the field of operational use. This can prevent additional expenditures, for example, attributed to removal and transporting server 10 to remote locations for servicing.

The COMExpress module 22 is preferably built around an open standard. The adaptability of the present invention is also evidenced in that the disclosed invention may apply standardized features, such as those from VITA 48 also known as Ruggedized Enhanced Design Implementation (REDI). While particular standards such as VITA 48.2 are more typically based upon blade-based computer modules, applications are found in their applied concepts to COM and, in particular, COMExpress of the presently disclosed system. The result of such features includes, inter alia, the disclosed computer system having the presently described COMExpress computer module heatsink assembly 34. As a result, aspects of the invention provide enhanced field serviceability, an improved integrated cooling solution, and a practical means for facilitating insertion and/or removal of the COMExpress computer module 22, as described herein. Other improvements include application of the disclosed system within ruggedized environments, such as those found in military and aerospace engineering conditions, while at the same time providing high density computer packaging to generate an improved computer solution.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A computer apparatus comprising:
   a computer chassis;
   a computer module, said computer module supporting a computer-on-module (COM) format and including a plurality of electrical components, a bus for input/output peripherals, and computer module connectors;
   a baseboard disposed in said computer chassis, said baseboard including baseboard connectors that are coupled to the computer module connectors, said baseboard breaking out said bus of said computer module to peripheral connectors for said input/output peripherals;
   a heat sink assembly attached to said computer module to form a computer module-heat sink assembly, said heat sink assembly being disposed on a first side of said computer module-heat sink assembly and said computer module being disposed on a second side of said computer module-heat sink assembly, said second side being opposite said first side, said electrical components and said computer module connectors of said computer module facing outwardly from said second side, each of said electrical components being removable from said computer module without detaching said computer module from said heat sink assembly, and said computer module connectors extending from said second side into the coupling with the baseboard connectors,
   wherein said computer module-heat sink assembly is configured to be alternately removed or attached to said computer chassis, and when said computer module-heat sink assembly is attached to said computer chassis, said heat sink assembly forms part of an integral exterior structure of said computer chassis.

2. The apparatus of claim 1, wherein the heat sink assembly is attached to said computer chassis via one or more fasteners.

3. The apparatus of claim 1, wherein the computer module supports COMExpress format.

4. The apparatus of claim 1, further comprising a computer bus interface for connecting host bus adapters to mass storage devices.

5. The apparatus of claim 4, wherein the computer bus interface includes Serial Advanced Technology Attachment (SATA) technology.

6. The apparatus of claim 1, wherein the heat sink assembly is directly attached to the computer module.

7. The apparatus of claim 1, wherein the apparatus is configured to dissipate heat through the computer module heat sink assembly and exterior to the apparatus.

8. The apparatus of claim 1, wherein the apparatus is configured to dissipate heat through the computer module into the heat sink assembly and exterior to the apparatus.

9. The apparatus of claim 1, wherein said computer module includes a circuit board, and said plurality of electronic components are coupled to said circuit board.

10. The apparatus of claim 1, further comprising an internal compartment extending inwardly from said an exterior surface of said chassis for receiving said computer module heat sink assembly in mated fashion, said baseboard connectors being disposed in said internal compartment.

11. The apparatus of clam 10, wherein the computer module heat sink assembly forms a water and air tight seal with the internal compartment of the chassis in mated fashion.

12. The apparatus of claim 10, wherein the computer module heat sink assembly comprises a plurality of fins integrated on a surface thereon, and the exterior of the chassis comprises a plurality of integrated fins, wherein the fins of the computer module heat sink assembly and the fins of the chassis form an integrated fin structure when the computer module heat sink assembly is mated with the compartment of the chassis.

13. A method of manufacturing an electronic device, comprising:
 providing a computer chassis, a computer module, a baseboard, and a heat sink assembly, said computer module supporting a computer-on-module (COM) format and including a plurality of electrical components, a bus for input/output peripherals, and computer module connectors, said baseboard disposed in said computer chassis and including baseboard connectors;
 attaching said heat sink assembly to said computer module to form a computer module-heat sink assembly, said heat sink assembly being disposed on a first side of said computer module-heat sink assembly and said computer module being disposed on a second side of said computer module-heat sink assembly, said second side being opposite said first side, said electrical components and said computer module connectors of said computer module facing outwardly from said second side, each of said electrical components being removable from said computer module without detaching said computer module from said heat sink assembly, and said computer module connectors extending from said second side; and
 removably attaching said computer module-heat sink assembly to said computer chassis so that said heat sink assembly forms part of an integral exterior structure of said computer chassis and so that said computer module connectors are coupled with said baseboard connectors, said baseboard being coupled to said computer module to break out said bus of said computer module to peripheral connectors for said input/output peripherals.

14. The method of claim 13, wherein said computer module includes a circuit board, and said plurality of electronic components are coupled to said circuit board.

15. The method of claim 13, further comprising:
 positioning, in mated fashion, said computer module-heat sink assembly in an internal compartment extending inwardly from an exterior surface of said chassis, said baseboard connectors being disposed in said internal compartment.

16. The method of clam 15, further comprising:
 forming a water and air tight seal with the internal compartment of the chassis via the computer module heat sink assembly.

17. The method of claim 15, further comprising:
 forming a plurality of fins integrated on a surface of the computer module-heat sink assembly;
 forming a plurality of fins integrated on the exterior of the chassis; and
 forming an integrated exterior fin structure formed by the fins of the computer module-heat sink assembly and the fins of the chassis when the computer module-heat sink assembly is mated with the compartment of the chassis.

\* \* \* \* \*